Figure 2:
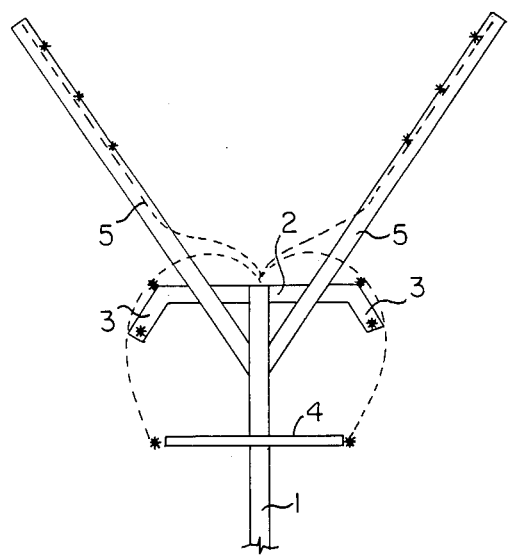

United States Patent [19]

Daniell

[11] Patent Number: 4,625,454
[45] Date of Patent: Dec. 2, 1986

[54] ESPALIER SYSTEM AND VINE MANAGEMENT PROGRAMME SUITABLE FOR KIWI FRUIT

[76] Inventor: Wynton M. Daniell, Matahui Rd. R.D.2, Aongatete Katikati, New Zealand

[21] Appl. No.: 666,650

[22] Filed: Oct. 31, 1984

[30] Foreign Application Priority Data

Nov. 21, 1983 [NZ] New Zealand ............ 206343

[51] Int. Cl.$^4$ ............................................ A01G 17/06
[52] U.S. Cl. ............................................ 47/44; 47/47
[58] Field of Search ................ 47/44, 45, 46, 47; D25/71

[56] References Cited

U.S. PATENT DOCUMENTS

| | | | |
|---|---|---|---|
| 57,381 | 8/1866 | Roberts et al. | 47/45 |
| 63,119 | 3/1867 | Van Dewerken | 47/45 |
| 80,104 | 7/1868 | Welber | 47/44 |
| 88,074 | 3/1869 | Rathbur | 47/44 |
| D. 195,484 | 6/1963 | Klein | D25/71 |
| 3,157,001 | 11/1964 | Vail | 47/47 |
| 3,526,993 | 9/1970 | Silbol | 47/46 |
| 3,585,756 | 6/1971 | Johnson | 47/46 |

OTHER PUBLICATIONS

General Viticulture by A. J. Winkler et al, 12/19/74, pp. 322 and 323.

Primary Examiner—Robert A. Hafer
Assistant Examiner—Bradley M. Lewis
Attorney, Agent, or Firm—Holman & Stern

[57] ABSTRACT

A growing system for vines which is particularly applicable to kiwi fruit which uses an espalier arrangement. The system is such that a canopy of branches are supported while at the same time divergent branches which will form part of the canopy in the ensuing season are supported upwardly in a divergent manner above the canopy. The invention also consists in the frames and framing systems.

4 Claims, 9 Drawing Figures

ESPALIER SYSTEM AND VINE MANAGEMENT PROGRAMME SUITABLE FOR KIWI FRUIT

The present invention relates to improvements in and/or relating to espalier frames for supporting wires, strings, cables, tapes or the like (hereinafter simply referred to as "wires") which in turn support rows of a vine, systems using same and methods of vine management utilising a system involving such apparatus.

With the advent of kiwi fruit horticulture in New Zealand there has been developed an espalier system which utilises frames which will support an array of wires so as to support (in section transverse to the row direction) a canopy structure. Such systems are commonly known as the "T" bar system or the "kiwi arch" system. Such systems lend themselves readily to picking without the need for ladders and also lend themselves to the use of machines for harvesting purposes. While such systems obviously provide a harvestable yield above that which would be derived without the use of espalier frames, the growing efficiency of the kiwi fruit vine (and this should be applicable to all other vines) far surpasses that utilised by such systems and therefore there would be advantages if some espalier system was evolved which took full advantage of this greater growing efficiency.

It is therefore an object of the present invention to provide means and/or methods which will go at least some way to meet the above mentioned desiderata or which will at least provide the public with a useful choice.

Accordingly in one aspect of the present invention consists in a frame for supporting row-wise extending vine support members (hereafter referred to as "wires") of an espalier system comprising:

an upright support,
framing means dependent from said upright support for supporting wires which will support branches of a vine in a canopy substantially symmetrically about the vine leader, and
divergent wire support means extending substantially symmetrically up beyond the framing means to carry row-wise extending wires which support branches of the vines in a divergent upwardly splayed manner substantially symmetrically about each vine leader.

Preferably each said wire support means is of a rigid non-tensioned construction. In other preferred forms each said wire support means is under tension and is not under tension would not be self supporting.

Preferably said upright support carries said framing means and, at least in part, said wire support means. It should be realised that the wire support means could be linked directly or indirectly to those of an adjacent row or to some overhead supporting structure e.g. a cable.

Preferably the frame is substantially as hereinafter described with reference to the accompanying drawings.

In a further aspect the present invention consists in an espalier system using frames in accordance with the present invention.

Preferably at least some of the wire support means are supported to some extent by a linkage directly or indirectly to wire support means of an adjacent row.

In a further aspect the present invention consists in a vine management method which comprises providing an espalier supported row of vines having a canopy on either side of lower fruiting branches and for each vine two upwardly extending divergent branches substantially symmetrically about the row-wise direction above said canopy branches, allowing the growth of at least two branches from each vine between the two upwardly extending branches and after harvest and before the ensuing harvest, removing, at least to a substantial extent, the fruit branches forming part of the canopy, moving the fruiting branches that were supported by the divergent framing elements to define the canopy structure for the ensuing season and engaging said branches that grew between the two upwardly extending branches to assume the position previously taken by those branches prior to their being moved.

Preferably said vines are Kiwifruit vines.

Preferably the method is carried out using wires and frames in accordance with the present invention.

Preferably the vine management system or method is carried out substantially as hereinafter described.

Figure 1:
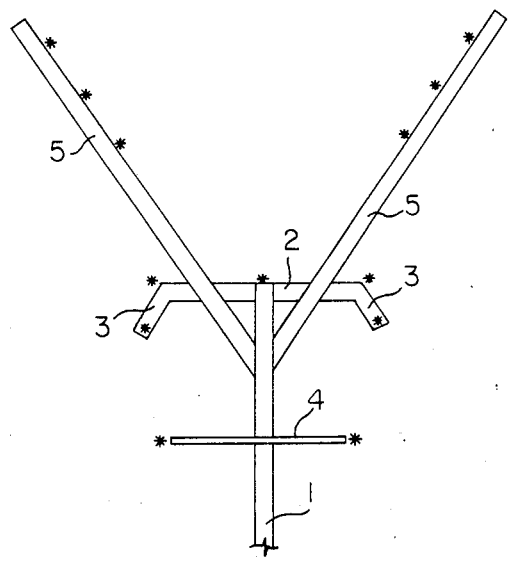
Figure 3:
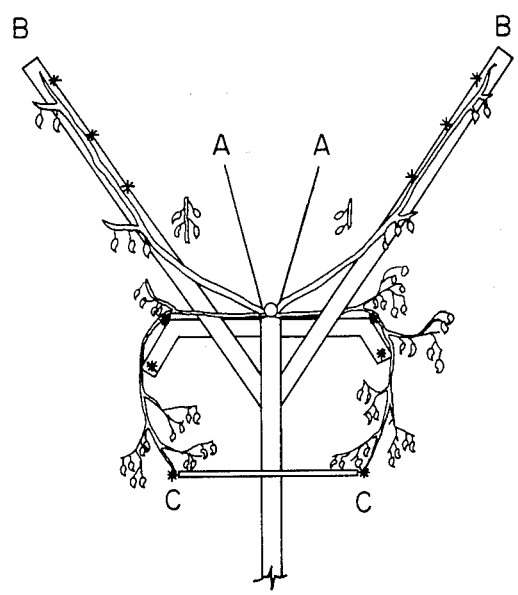
Figure 4:
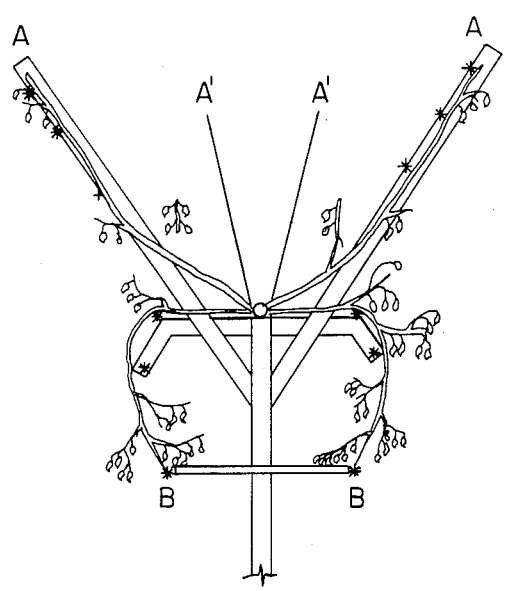
Figure 5:
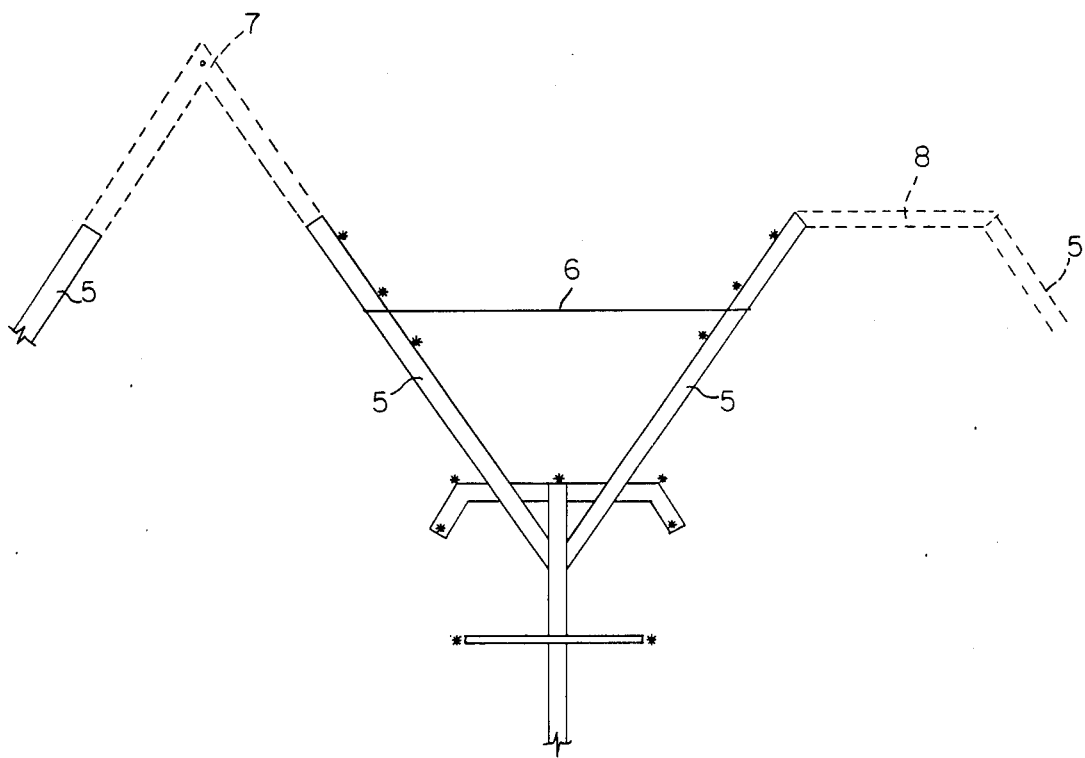
Figure 6:
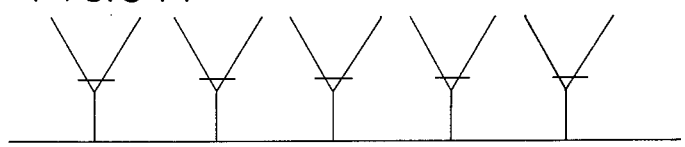
Figure 6:
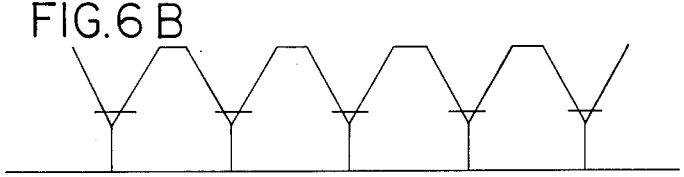
Figure 6C:
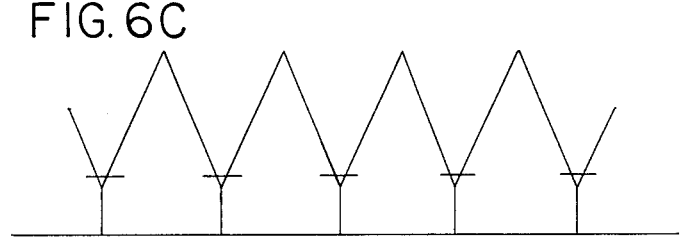
Figure 6:
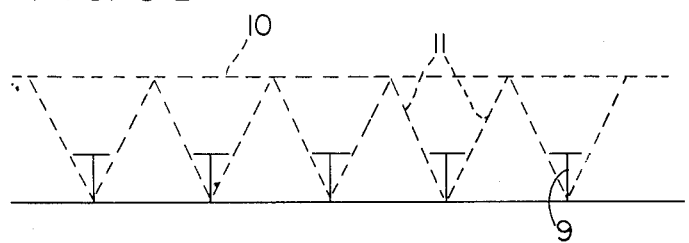

One preferred form of the present invention will now be described with reference to the accompanying drawings in which FIG. 1 is a view of a preferred frame in accordance with the present invention, the asterisks 12 denoting wires which will extend row wise along a row of the frames and each of which is attached, for example, by staples or other means to the frames, it being seen how divergent framing elements extend upwardly beyond the framing means which in two portions defines the support for the fruiting branches of a vine which will provide the canopy, FIG. 2 is the same drawing as shown in FIG. 1 but showing in dotted outlines the substantial symmetrical arrangement of canopy and upwardly extending fruiting branches from a leader of a vine, FIG. 3 is a similar diagram to that of FIGS. 1 and 2 but showing diagrammatically between the upwardly extending substantially symmetrical fruiting branches two non-fruiting branches, those branches indicated as A being branches produced by the current seasons growth, those branches denoted by B being those branches produced by the previous seasons growth and those branches denoted by C being branches produced by growth from a previous season, FIG. 4 is a diagram showing the rearrangement of branches A and B after harvest ready for fruiting in the ensuing season, those branches C having been removed and the forthcoming growth from the fresh season being indicated as $A^1$, FIG. 5 is a similar diagram to that of FIG. 1 but showing how, if desired, a cross bracing wire or member can be provided between the divergent wire support means and if (as in the preferred form of the invention) the wire support means are of a rigid nature the same can be supported at their upper distal ends from an adjacent row either via a direct connection (as indicated with the left wire support means) or by means of a linkage (as shown with the right wire support means), and FIGS. 6a to 6d show various configurations looking along the rows with FIG. 6a showing the end view of a plurality of rows using a system as shown in FIGS. 1 to 4 or substantially of that kind, FIG. 6b shows a similar system to that of FIG. 6a but linked by members as depicted with the right hand wire support means in FIG. 5, FIG. 6c shows a similar arrangement to FIG. 6a but with the wire support means directly coupled in a manner shown with left hand wire support means in FIG. 5 and FIG. 6d shows a quite alternative construction where in dotted outline are shown cables or wires under tension capable of supporting row-wises extending wires or the equivalent which will support the branches, the arrangement of FIG. 6d being readily incorporated around existing T-bar espalier systems for kiwifruit.

The present invention can be readily understood by reference to the accompanying drawings. It should be realised in relation to FIGS. 3 and 4 that some of the "fruiting branches" include smaller branches which may not necessarily be from the season stated in relation to the majority of the branch system indicated by its associated letter. A person skilled in the art will appreciate however the nature of vine growth and fruiting as, for example, is the case with kiwi fruit.

In one preferred form of the present invention a main upright post or like member 1 is provided having a T-bar 2 preferably with down-turned extremities 3. Also provided is a cross member 4. Portions 2, 3 and 4 support wires that are attached thereto which preferably number a total of 7. Such wires support the canopy formed by branches C in FIG. 3 and by branches B in FIG. 4. Please note that preferably canes B would be attached outside of the wires.

Extending upwardly are divergent members 5, (the wire support means) each of which is supported directly or indirectly from the post 1 and the T-bar 2. Preferably all members are formed from wood although this is not necessary.

It can be seen that the divergent framing elements 5 and upwardly a significant distance and are angled relative to each other by an angle of about 60°. Each member 5 preferably carries three row wise extending wires.

With the present system, it is possible to retain fruiting canes of about 2.3 meters in addition to the 1.6 meter canes retained on conventional structures. The resultant approximate 144% increase of cane length greatly enhances the fruiting potential. The following system has been used with success:

Materials—We have used 100×25 mm timber which in time we will laminate. Galvanised steel or pipe would be equally suitable as would alloy.

Dimensions—Approximately as noted. The length of the V shaped additions may need to be varied depending upon row spacing in various orchards, so that a gap of approximately 1.5 m is maintained between the rows as measured from the top of the V's in adjacent rows. This is to facilitate adequate light interception.

Fixing—The additions could be nailed, screwed or bolted.

Wire—Galvanised, attached to the inside of the V with staples, although this could change depending on materials used in the V. Wire spacing not too critical.

Angle—The angle inside the V has been set at 60° to comply with findings from trellis research re light interception, but this could be varied.

End Assemblies—At the end of each row, a more substantial V is erected to withstand the added strain imposed by the tying off of the wires that run longitudinally.

Vine Management—The most salient feature of the conception is vine management. Normally under a T Bar support system of growing only canes A and B are retained, of which only canes B bear fruit. Canes B are restrained in the position shown for canes c. Under the modified system canes A grow unsupported as previously, (but sheltered by canes B.) Canes B that would normally be restrained in the position of canes C are attached to the wires added by the modification. After the harvest of fruit; canes C are severed. Canes B are detached from their erect position on the V and restrained in the position of the former canes C whose age and fruiting habit they adopt in the ensuing season. Canes A are attached to the newly added wires and become equivalent of canes B in the ensuing season.

In the most preferred form of the present invention the wire support means is formed in steel. In one form it can be of a rigid nature such as shown in FIGS. 6a to 6c which can be better understood with reference to FIG. 5. Please note however, that the direct coupling between the espalier frames of adjacent rows (as shown on the left hand side of FIG. 5) and the indirect coupling (as shown on the right hand side of FIG. 5) is not an essential feature of the present invention. Additionally it is important to note that the bracing cross wire depicted between the divergent frame members likewise is not essential although it does allow a lighter construction to be utilised. For example, a cross wire member 6 is best employed where the members 5 are formed from steel. An appropriate contoured steel member is, for example, that marketed in New Zealand by Franklin Machinery limited, 37 Subway Road, Pukekohe, New Zealand under the trademark, Kiwitah.

The direct linkage at 7 is shown diagrammatically for a plurality of rows in FIG. 6c. The indirect linkage 8 is shown diagrammatically in FIG. 6b. Obviously further variations are possible and indeed the bracing members can be in tension or compression depending on the manner of their engagement. Clearly however, a factor to be taken into account is the clearance needed between rows for machinery.

An interesting alternative is that depicted diagrammatically in FIG. 6d. Shown in solid outline above ground level is the conventional T-bar structure 9 which has been used with many kiwifruit plantations in New Zealand. The advantages of the present invention can be provided using an A frame type arrangement between the rows as shown, which arrangement can be formed from rigid materials (free standing or otherwise) or ideally by stressed wires dependant on an over head tensioned cable 10. Persons skilled in the art will appreciate how the cable or other members 11 which extend upwardly in a divergent manner above the T-bar (even though not necessarily deriving support therefrom) can fulfill a function of the divergent framing members previously described in relation to other embodiments of the present invention. Such a structure as depicted in 6d would still provide the requisite divergent support means extending substantially symmetrically beyond the framing means to carry row wise extending wires, which support branches of the vines in a divergent upwardly slayed manner substantially symmetrically about each vine leader.

It should be appreciated that components of the frame or espalier system of the present invention can be made in a multitude of materials and need not be restricted to the wooden or metal products previously mentioned. Obviously alternatives include fibreglass.

Inter-row bracing that has previously been described can be made permanent or removable. An advantage of this system as shown in FIG. 6d is that the overhead cable can be utilised to additionally support some protection materials suitable for protecting the vines from wind, hail, the sun or a combination thereof.

It is believed therefore that the present invention provides means, systems and methods which should find widespread acceptance.

What is claimed is:

1. A vine management method which comprises providing an espalier supported row of vines having a canopy of lower fruiting branches for each vine and two upwardly extending divergent framing elements for supporting younger branches above said canopy of branches, allowing the growth of at least two further branches from each vine between the two upwardly extending elements in a divergent upwardly extending manner substantially symmetrically about the row-wise direction and after harvest of the canopy of branches and before the ensuing harvest, removing, at least to a substantial extent, the branches forming the canopy, moving the younger branches that were supported by the divergent framing elements down to define a canopy structure for the ensuing season and engaging said further branches that grew between the two upwardly extending elements to assume the position previously taken by said younger branches prior to their being moved.

2. A vine management method comprising growing vines in rows and providing on row-wise extending wires a lower canopy of fruit branches on lower wires, each vine providing a fruiting branch of the lower canopy disposed transversely to each side of the row and an upper canopy of divergent fruiting branches on upper wires, and allowing fresh fruiting branches for future seasons to grow between the divergent fruiting branches of the upper canopy, the fruiting branches of the lower canopy of each vine conforming to a row-wise transverse configuration that is substantially a T or drooping T shape, the fruiting branches of the upper canopy of each vine conforming to a row-wise transverse configuration that is substantially Y-shaped, harvesting the fruit of the season from the lower canopy of branches, and before the ensuing harvest removing, at least to a substantial extent, the fruiting branches forming the lower canopy, moving the fruiting branches of the upper canopy to provide a lower canopy for the ensuing season and training to the upper wires said fresh fruiting branches so as to provide the upper canopy for the ensuing season.

3. A method as claimed in claim 2 wherein said vines are Kiwi fruit vines.

4. A method as claimed in claim 2 wherein said wires are supported from row-wise spaced frames.

* * * * *